US008491215B2

(12) United States Patent
Young

(10) Patent No.: US 8,491,215 B2
(45) Date of Patent: Jul. 23, 2013

(54) CONNECTOR FOR COUPLING ADJACENT MEMBERS

(75) Inventor: Gregory S. Young, Lancaster, NY (US)

(73) Assignee: Mattel, Inc., El Segundo, CA (US)

( * ) Notice: Subject to any disclaimer, the term of this patent is extended or adjusted under 35 U.S.C. 154(b) by 603 days.

(21) Appl. No.: 12/199,067

(22) Filed: Aug. 27, 2008

(65) Prior Publication Data

US 2010/0054855 A1 Mar. 4, 2010

(51) Int. Cl.
*F16B 7/10* (2006.01)

(52) U.S. Cl.
USPC .................................................. 403/109.3

(58) Field of Classification Search
USPC ............ 403/108, 109.1–109.3, 109.5, 109.7, 403/109.8, 327–329, 397, 377, 379.4, 379.6; 135/142, 114, 120.2
See application file for complete search history.

(56) References Cited

U.S. PATENT DOCUMENTS 3,347,575 A * 10/1967 Morris .......................... 403/107
3,886,962 A * 6/1975 Diamontis ...................... 135/69
3,911,510 A 10/1975 Bryant
4,104,000 A * 8/1978 Fleischmann ..................... 403/7
4,247,216 A 1/1981 Pansini
4,553,496 A * 11/1985 Foresman ................. 114/144 R
4,565,409 A * 1/1986 Hollonbeck et al. ....... 297/411.1
4,691,897 A * 9/1987 Frush ......................... 256/65.13
5,036,873 A * 8/1991 Clayton .......................... 135/69
5,171,052 A * 12/1992 Cunningham ............... 294/19.1
5,361,432 A 11/1994 Shamie
5,462,380 A * 10/1995 Peek et al. .................... 403/329
5,463,814 A * 11/1995 Stowell et al. .................. 30/232
5,548,864 A * 8/1996 Vosbikian et al. ........... 15/257.7
5,779,386 A * 7/1998 Eichhorn ...................... 403/329
5,871,227 A 2/1999 Huang
6,027,409 A 2/2000 Favorito et al.
6,052,853 A 4/2000 Schmid
6,067,676 A 5/2000 Carnahan et al.
6,079,894 A * 6/2000 Obitts ........................ 403/109.3
6,158,067 A * 12/2000 Cheng ............................... 5/106
6,170,853 B1 * 1/2001 Brown et al. ................. 280/642
6,179,513 B1 * 1/2001 Marasco .................... 403/374.5
6,305,671 B1 * 10/2001 Valentine .................. 256/65.13
6,339,856 B1 1/2002 Chen et al.
6,343,890 B1 * 2/2002 Benson ......................... 403/329
6,371,686 B1 4/2002 Wu
6,434,768 B2 8/2002 Brown et al.
6,438,772 B1 8/2002 Brown et al.
6,685,207 B1 2/2004 Blake
6,851,745 B2 2/2005 Wilkins et al.
6,854,916 B2 2/2005 Hsieh (Continued)

OTHER PUBLICATIONS

International Search Report and Written Opinion for PCT/US2009/055109 dated Jan. 21, 2010, 7 pages.

*Primary Examiner* — Michael P Ferguson
*Assistant Examiner* — Daniel Wiley
(74) *Attorney, Agent, or Firm* — Edell, Shapiro & Finnan, LLC

(57) ABSTRACT

The present invention discloses a connector for selectively coupling a first member and a second member that are configured to move relative to each other. Each of the first member and the second member includes an opening. A connector that includes a flexible body that has a projection may be inserted within one of the members. The projection is configured to extend through the openings of the members to couple the first member to the second member. The connector also includes a mechanism that selectively couples the connector relative to the first member.

8 Claims, 6 Drawing Sheets

U.S. PATENT DOCUMENTS 6,886,839 B2 5/2005 Everett
7,081,052 B2 7/2006 Greger et al.
7,334,957 B2 * 2/2008 Sadinsky et al. ........... 403/109.3
2009/0190995 A1 * 7/2009 Xu et al. .................... 403/109.3

* cited by examiner

CONNECTOR FOR COUPLING ADJACENT MEMBERS

BACKGROUND OF THE INVENTION

The present invention relates to a connector that coupled together structural members. In particular, the present invention relates to a connector that can be used to couple and secure adjacent tubular structural members.

Various support structures, such as infant support structures, use tubes as structural elements that are commonly packaged with some or all of the tubes separated to minimize the size of the package. For example, infant support structures, such as swings, playpens, strollers, and bouncers, typically have a frame that includes several tubes or tubular members that are coupled together by the end user to assemble the frame. Usually, two tubes are coupled together in an end-to-end manner (along a common longitudinal axis). A common technique for joining two tubes end-to-end is to swage the end of one of the tubes (to reduce its diameter) and to insert the swaged end into the end of the other tube.

Typically, the connected tubes are prevented from separating longitudinally by fixing a mechanical fastener to the mating ends of both tubes. One technique for fixing a mechanical fastener is to drill mating holes though one or both walls of both tubes and to place a fastener, such as a screw or a nut and bolt, through the holes. This technique produces a connection that is generally resistant to relative axial and angular movement of the tubes. However, the technique requires the end user to use tools to fasten the tubes and makes it relatively inconvenient to disassemble and reassemble the tubes.

Another technique for fixing a mechanical fastener to the tubes involves drilling mating holes through one wall of the tubes, and placing a spring-loaded button inside the swaged tube so that a portion of the button protrudes through the hole in the swaged tube. When the other tube is slid onto the swaged tube and the hole in that tube aligned with the button, the button moves into the hole, fastening the tubes together. Although this allows assembly without tools and permits ready disassembly and reassembly (by pressing the button radially inwardly into the swaged tube to clear the hole in the other tube and pulling the tube free), the connection is not as resistant to relative movement of the tubes as is the first technique. This is due in part to the fact that the holes must be formed slightly larger than the outside diameter of the button to ensure that the button can freely move through the holes.

The slight relative axial movement allowed by this connection technique is usually not problematic. However, the relative angular movement may be problematic and undesirable in situations where either or both tubes are connected to structure that is substantially spaced from the common longitudinal axis of the tubes and that relies on angular registry of the tubes for proper relative positioning. In such situations, a slight relative angular movement at the joint can translate to improper positioning of the related structures. A joint that is easily assembled and disassembled without tools yet which provides good resistance to relative angular movement of the connected tubes would therefore be desirable. In some conventional infant support structures, a connector that includes a spring-biased button can be used to couple two support members. However, the movement of such connectors relative to the support members cannot be controlled or limited.

There is a need to develop an improved connector that can selectively couple two adjacent members. In addition, there is a need for a connector that can be selectively locked and the movement of which can be controlled and limited.

SUMMARY OF THE INVENTION

Generally, the present invention related to a connector for selectively coupling or securing adjacent members to each other. In one implementation, the adjacent members can be support members, such as tubes or tubular members, which are configured so that the end of one tube can be inserted into the end of the other tube. The connector can be used to securely lock the adjacent members in place and together.

In one embodiment, the connector includes a flexible body having a first end and a second end. The body can be U-shaped or substantially U-shaped so that the first end of the body is proximate to the second end of the body. The first end and the second end are biased away from each other by the resilient nature of the member. When the first end and the second end are urged together, the flexible member resists the urge and forces the two ends apart or away from each other.

In one embodiment, the flexible body includes a first portion and a second portion. The first portion has a proximal end and a distal end and the second portion also has a proximal end and a distal end. The distal end of the first portion corresponds to the first end of the body and the distal end of the second portion corresponds to the second end of the body. Each of the first end and the second end of the flexible body includes an inner surface that faces the inner surface of the other end. Each of the first end and the second end also includes an outer surface opposite to its inner surface.

In one embodiment, the first end includes a projection on its outer surface. The second end includes a flexible abutment or engagement member on its inner surface. When a user urges the first end and the second end toward each other, the inner surface of the first end moves toward the abutment on the inner surface of the second end. If the first portion or first end is moved a sufficient distance, the first portion engages the abutment, which limits the distance that the first end and the second end of the body can travel toward each other.

As mentioned above, the connecter in accordance with the present invention is configured to selectively couple or lock one member or support member relative to another member. In one embodiment, the members are tubular members. One end of either of the members is swaged so that the reduced diameter end can be inserted or slid into an opening formed in the end of the other member.

Each of the support members includes an opening which can be aligned with the opening on the other member when the members are coupled together. The connector can be disposed within an inner surface of one support member with its projection extending through the opening in that support member. A second end of the U-shaped flexible member pushes against an inner surface of the member to bias the projection on the first end through the opening. The other support member can then be placed or slid onto the member containing the connector.

The projection is depressed against the bias force of the flexible member. The other support member is then slid over the outer surface of the swaged portion of the member with the connector and the projection as it is depressed. The support members are positioned so that at least one of the openings on each support member are aligned to allow the projection can pass through both openings. When the projection extends through the openings, the positions of the members relative to each other are locked or fixed.

The connector includes a flexible abutment that can be selectively reconfigured between a first position in which the abutment contacts the first end as if the first end is urged toward the second end and a second position in which the abutment does not contact the first end when the first end is urged toward the second end. In one embodiment, the connection is configured such that when the abutment is in the first position, the abutment prevents the first end and the projection from further movement toward the second end. If the projection cannot move toward the second end a sufficient distance so that it clears the first opening, the projection, and thus the connector, cannot move relative to the first member in which it is disposed. In other words, the projection is trapped in the first opening and cannot move relative to the first member. On the other hand, if the abutment is moved to its second portion position so that it does not prevent the first end and the projection from being depressed through the first opening, the projection and the connector can be displaced relative to the first member.

To release the members from their locked relationships, the projection, which protrudes through the members, is pressed inwardly and forced back through the opening of the outer member against the biasing force of the flexible body. When the projection is depressed so that the projection no longer protrudes from or extends into the opening of the outer member, the members are unlocked and the members can be slid relative to each other.

BRIEF DESCRIPTION OF THE DRAWINGS

Like reference numerals have been used to identify like elements throughout this disclosure.

DETAILED DESCRIPTION OF THE INVENTION

In one embodiment, the present invention relates to a connector for coupling a first member and an adjacent, second member. The terms "first" and "second" are used herein to refer to two different objects or structures and are not intended to be limited in any way. The connector can be used to lock selectively the movement of the first member relative to the second member.

The connector according to the present invention can be used with various support structures. The term "support structure" is used to refer to any frame or support that is configured to provide support for an object. A support structure may includes multiple supports or support members that are formed separately, but coupled together by a user to form a frame. One type of support structure is an infant support structure. The term "infant support structure" can be used to refer to any frame or support that can be used to support an infant in a stationary manner or in a moving manner. Some exemplary infant support structures are swings, bassinets, playards, cribs, jumping devices, bouncers, high chairs, etc. The terms "infant support structure" and "child support apparatus" can be used interchangeably herein to refer to an apparatus or structure that is configured for use with an infant or young child. For example, a structure may include a receiving portion or area that is configured to receive an infant therein.

The term "connector," "locking mechanism," "coupler," and "coupling mechanism" can be used interchangeably to refer to a device or mechanism that can be used to couple or secure two objects together. In addition, such a device or mechanism is configured to prevent or limit movement of the objects relative to each other. The terms "secure," "couple," "connect," and "lock" can be used interchangeably herein to refer to the manner in which two objects are held in place together. The terms "support," "member" and "support member" may be used interchangeably herein.

Figure 1:
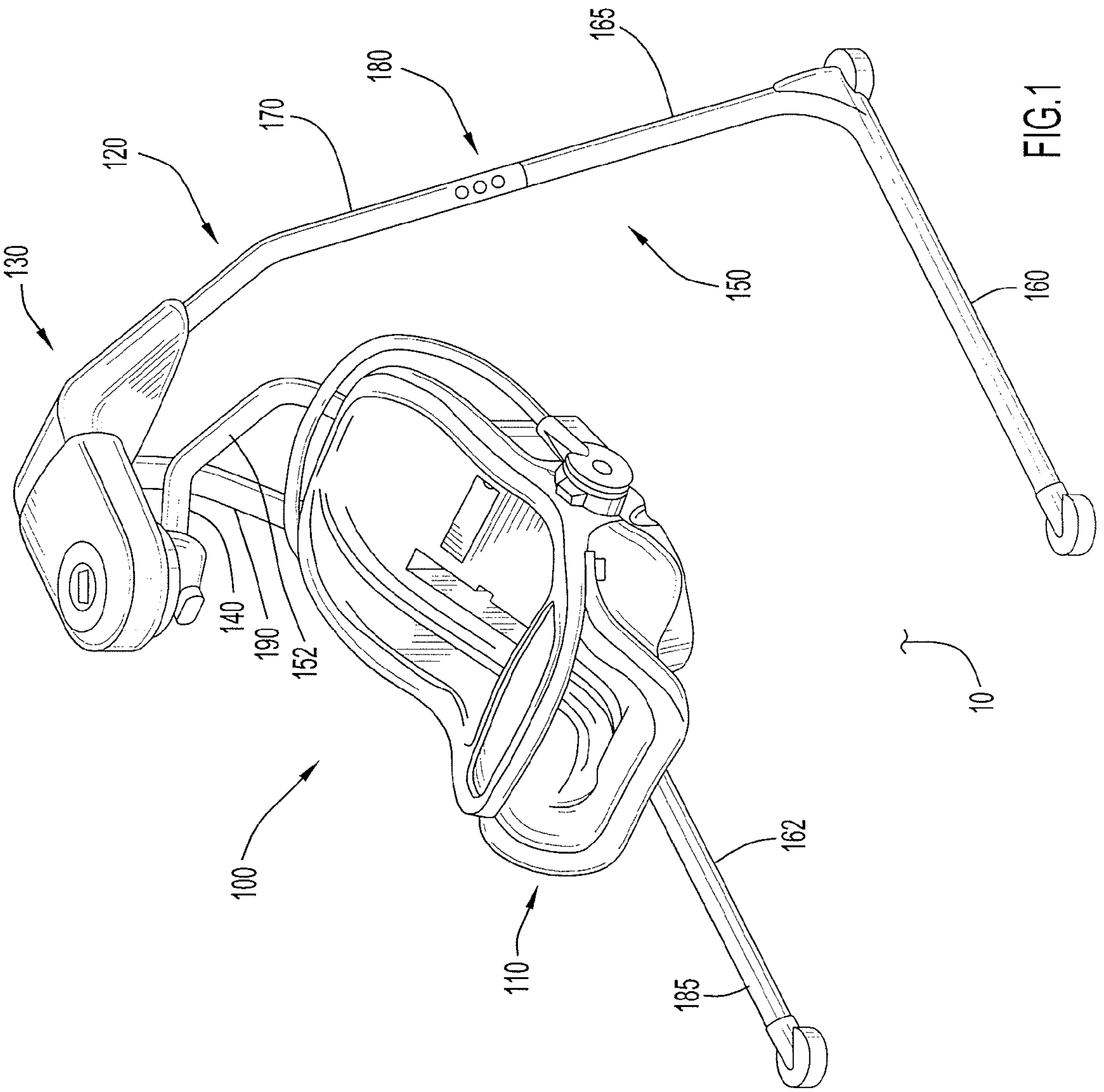
FIG. 1 illustrates a perspective view of an exemplary embodiment of an infant support structure with which a connector according to the present invention can be used.

Referring to FIG. 1, an exemplary embodiment of an infant support structure with which a connector according to the invention can be used is illustrated. The infant support structure or child support apparatus 100 is intended to be exemplary and not limiting. In this embodiment, the child support apparatus 100 is a swing. In other embodiments, the child support apparatus 100 can be a high chair or other infant support structure, as referenced above.

The child support apparatus 100 includes a seat or receiving portion 110 that is configured to receive a child. The seat 110 is supported by a support frame 120 that is configured to engage a support surface 10. The support frame 120 supports a hub or housing 130 that movably supports a support arm 140. A drive mechanism (not shown) is provided in the housing 130 to move the support arm 140 relative to the frame 120. The seat 110 is coupled to one end of the support arm 140.

In this embodiment, the support frame 120 includes a first leg member 150 that is coupled to the housing 130 and a second leg member 152 that is coupled to the housing 130. The first leg member 150 includes a base member 160 that is configured to be placed on the support surface 10. Similarly, the second leg member 152 includes a base member 162 that is configured to be placed on the support surface 10.

For a compact or collapsed configuration, leg members 150 and 152 are collapsible in that each leg member includes multiple support members that can be decoupled from each other. As shown in FIG. 1, the first leg member 150 includes a first member 165 and a second member 170 that is coupled to the first member 165. The first member 165 is the lower leg or tubular member and the second member 170 is the upper leg or tubular member. The first member 165 and the second member 170 are coupled together at a connection area 180 in an end-to-end configuration. Similarly, second leg member 152 includes a first member 185 and a second member 190 that is coupled to the first member 185. First member 185 and second member 190 are coupled together in an end-to-end configuration as well.

In one embodiment, first members 165 and 185 have similar configurations and second members 170 and 190 have similar configurations. The first members 165 and 185 and the second members 170 and 190 are relatively thin-walled tubular members.

Figure 2A:
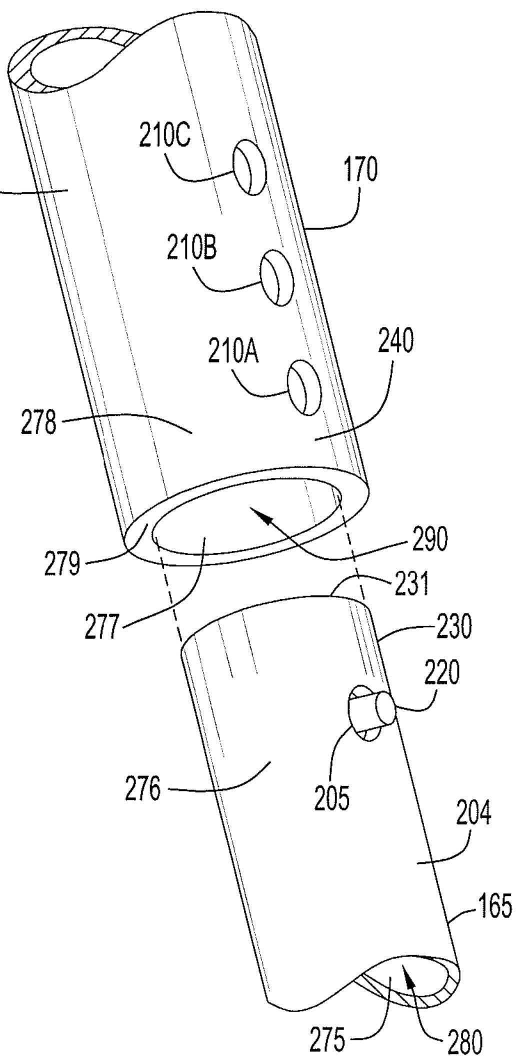
FIG. 2A illustrates a perspective view of two support members of an infant support structure spaced apart from each other according to the present invention.
Figure 2B:
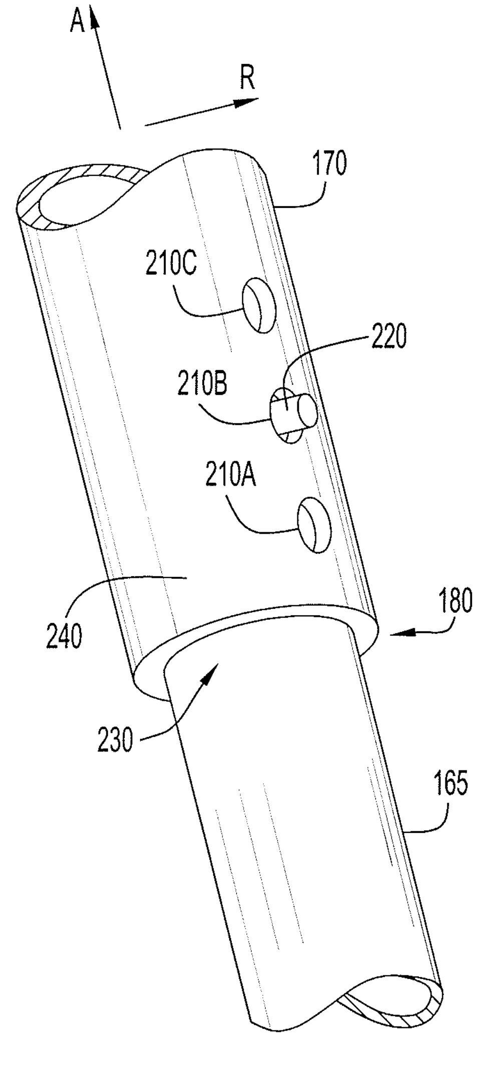
FIG. 2B illustrates a perspective view of two support members illustrated in FIG. 2A in an assembled configuration.

Referring to FIGS. 2A and 2B, an exemplary coupling or connection of members 165 and 170 is illustrated. It is to be understood that this illustrated coupling technique and structure can be used with support members having any size and shape. In particular, the connection area 180 of members 165 and 170 is illustrated. Referring to FIG. 2A, the first member 165 has a body 204, with an outer surface 276 and an inner surface 275 that defines a channel or passageway 280 therethrough. The body 204 includes a hole or opening 205 that extends from the inner surface 275 to the outer surface 276. The first member 165 also includes a connection end 230 with an edge 231.

The second member 170 includes a body 206 with an outer surface 278 and an inner surface 277 that defines a channel or passageway 290 therethrough. The body 206 includes several holes or openings 210A, 210B, and 210C that extend from the inner surface 277 to the outer surface 278. The openings 210A, 210B and 210C are spaced in the axial direction A along the length of the second member 170. The second member 170 includes a connection end 240 with an edge 279 that is configured to slide onto the connection end 230 of the first member 165, as shown in FIG. 2B.

As shown in FIG. 2A, the outer surface 276 of the first member 165 aligns with the inner surface 277 of the second member 170. The outer diameter of the first member 165 is slightly smaller than the inner diameter of the second member 170. The end of the first member 165 slides easily within the second member 170 so that the outer surface 276 of the first member 165 and the inner surface 277 of the second member 170 slide along and are adjacent to each other.

In this embodiment, the first member 165 has a connector disposed with in the channel 280 with a projection 220 that extends through opening 205. As described in detail below, the connector is a resilient member that is configured to bias the projection 220 outwardly through the opening 205.

As shown in FIG. 2B, the first member 165 and the second member 170 connect together to define an axial directional axis A and a radial directional axis R. The connection area 180 of the members 165 and 170 is formed when connection end 230 of the first member 165 is inserted into connection end 240 of the second member 170.

To couple the members 165 and 170 together as shown in FIG. 2B, a user must depress the projection 220 against the biasing force of the flexible member. The projection 220 must be depressed sufficiently so that edge 279 of the second member 170 does not contact the projection 220 as the first member 165 is inserted into channel 290 of the second member 170. The first member 165 is inserted into the second member 170 along the axial direction A and angularly adjusted until opening 205 is aligned with one of the openings 210A, 210B or 210C. The projection 220 that extends from opening 205 can then extend through the particular opening 210A, 210B, or 210C. The projection 220 is configured to engage the first member 165 and the second member 170.

Referring to FIG. 2B, opening 205 is aligned with the second opening 210B in the second member 170 and projection 220 protrudes from the second opening 210B. In one embodiment, the diameter of the projection 220 is slightly smaller than the diameter of each of the openings 205, 210A, 210B, and 210C so that the projection 220 extends through the openings easily. A user can adjust the height of the frame of the support structure by aligning the opening 205 and the projection 220 with the desired opening on the second member 170.

Figure 3A:
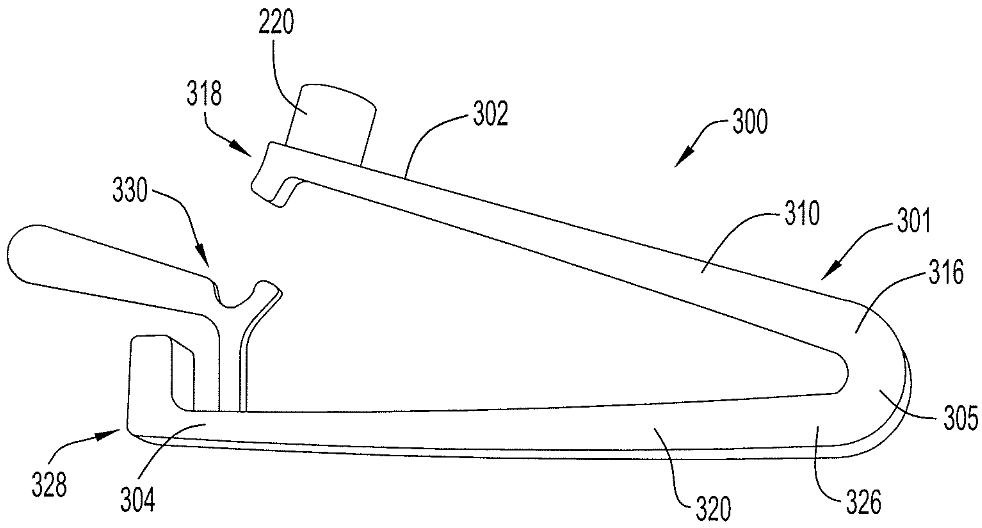
FIGS. 3A-3C illustrate a perspective view, a side view and an end view, respectively, of an embodiment of a connector according to the present invention.
Figure 3B:
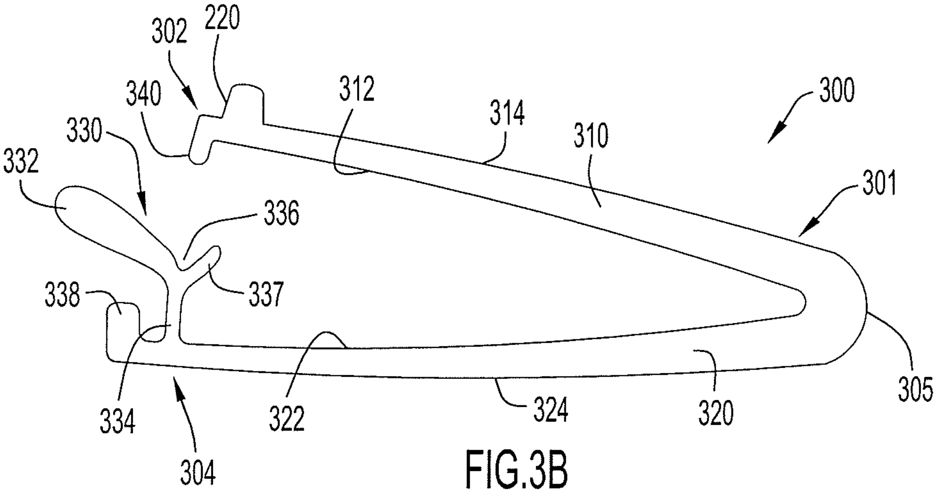
Figure 3C:
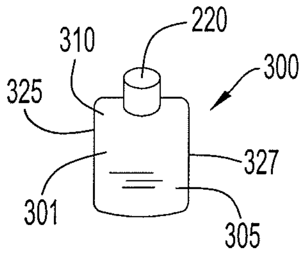

FIGS. 3A-3C illustrate a perspective view, a side view, and an end view, respectively, of an embodiment of a connector according to the present invention. In this embodiment, the connector or coupler 300 includes a flexible body 301 with ends 302 and 304. The flexible body 301 has a first portion 310 and a second portion 320 that extends away from the first portion 310. In this embodiment, the first portion 310 and the second portion 320 are formed integrally with each other. In another embodiment, the first portion 310 and second portion 320 are formed separately from each other and subsequently coupled to each other. As shown in FIG. 3C, the body 301 includes side edges 325 and 327.

In this embodiment, the flexible body 301 includes a living hinge 305 that biases the first portion 310 and the second portion 320 away from each other. In one embodiment, the first portion 310 extends away from and is biased away from the second portion 320 a distance greater than the inner diameter of frame member 165. As a result, when the flexible body 301 is disposed in the channel or passageway 280 of member 165, the first portion 310 and the second portion 320 are biased against opposite sides of the inner surface 275 of member 165.

The first portion 310 has a proximal end 316 and a distal end 318. Similarly, the second portion 320 has a proximal end 326 and a distal end 328. The proximal ends 316 and 326 of the portions 310 and 320 are proximate to the hinge 305 and the distal ends 318 and 328 are away from the hinge 305 and movable relative to each other.

The first portion 310 has an inner surface 312 and an outer surface 314 (see FIG. 3B). Similarly, the second portion 320 has an inner surface 322 and an outer surface 324. When the body 301 of connector 300 is positioned in member 165, the outer surface 314 of the first portion 310 and the outer surface 324 of the second portion 320 contact opposite parts of inner surface 275 of the first portion 165. As shown in FIG. 3B, the inner surface 312 of the first portion 310 and the inner surface 322 of the second portion 320 are oriented toward other.

In this embodiment, the projection 220 is disposed proximate to the first end 302 of the body 301. In particular, the projection is disposed on the outer surface 314 of the first portion 310 so that the projection 220 is oriented and biased away from the second portion 320 and toward opening 205 in member 165. The first portion 310 also includes a stop member 340 proximate to the first end 302 of the first portion 310. As described in greater detail below, the stop member 340 limits the distance that the protrusion 220 and the first portion 310 can be depressed during use of the connector 300. The stop member 340 can be referred to as a stop, a projection, a protrusion, or other similar structure. In addition, the stop member 340 forms an inwardly extending projection.

Referring to FIG. 3B, the second portion 320 of this embodiment of the connector 300 is described in detail. In this embodiment, the second portion 320 includes an abutment or engagement member 330 that can be moved into different positions and have different configurations. The abutment 330 is configured to limit the movement of the first portion 310 toward the second portion 320 of the connector 300. The abutment 330 can be manipulated by a user as desired and as described below. The abutment 330 is formed proximate to end 304 of the body 301 of the connector 300. In this embodiment, the abutment 330 is integrally formed with the body 301 and proximate to the inner surface 322 of the second portion 320. The abutment 330 extends away from inner surface 322 toward the stop member 340 that is coupled to the first portion 310 of the connector 300.

In this embodiment, the abutment 330 includes an actuator or actuating portion 332 that can be manipulated by a user to move a portion of the abutment 330. As shown in FIGS. 3A and 3B, the abutment 330 includes a flexible stem or body portion 334 that supports the actuator 332 and a projecting portion 337. The flexible stem 334 is resilient in nature and is configured to return the abutment or engagement member 330 to a rest or unbiased configuration as shown. Between the actuator 332 and the extension 337 is formed a seat 336 that is configured to be engaged by the stop member 340 on the first portion 310.

The abutment 330 may also include an extension or projection 338 that is formed proximate to the end 304 of the second portion 320. The extension 338 can be used when the connector 300 is disposed within the first member 165 to aid in insertion and retrieval of the connector 300 during assembly, disassembly or operation. Also, extension 338 limits the movement of the first portion 310 of the connector 300. The extension 338 can have various shapes or configurations in different configurations. For example, in one embodiment, the extension 338 can have an elongate portion so that if most of the connector 300 is positioned deep within the channel 280 of member 165, a portion of the extension 338 extends outside member 165 for easy insertion or retrieval of the connector 300.

The seat 336 of the abutment 330 is configured to receive and limit the movement of the stop member 340. The seat 336 is formed as a recess or receiving area between the actuator 332 and a projecting portion 337. The flexible stem 334 supports the seat 336 and the actuator 332 between the first and second configurations, as described in greater detail below and in FIGS. 4A, 4B, and 5-6. As described below, the abutment 330 and the seat 336 can be moved from a first configuration in which the depressed stop member 340 contacts and is stopped by the seat 336 and a second configuration in which the depressed stop member 340 passes by the seat 336 (see FIG. 4B).

Figure 4A:
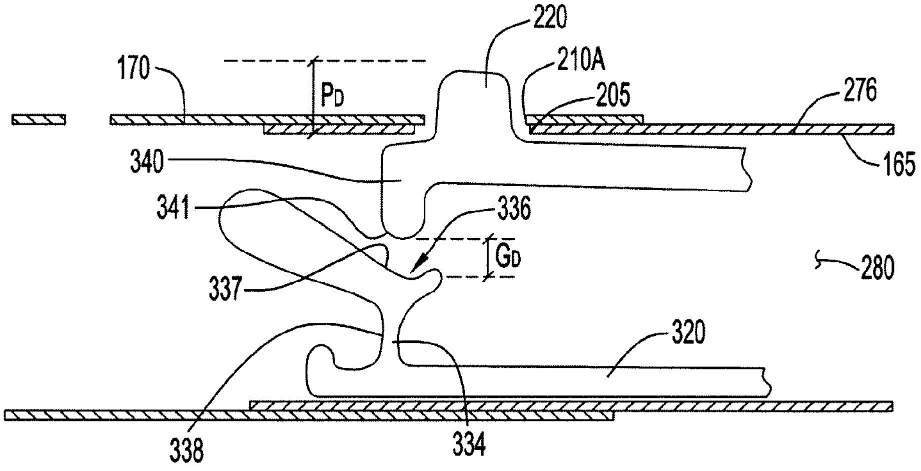
FIG. 4A illustrates a partial cross-sectional side view of the connector of FIG. 3A in a locking position relative to the support members.
Figure 4B:
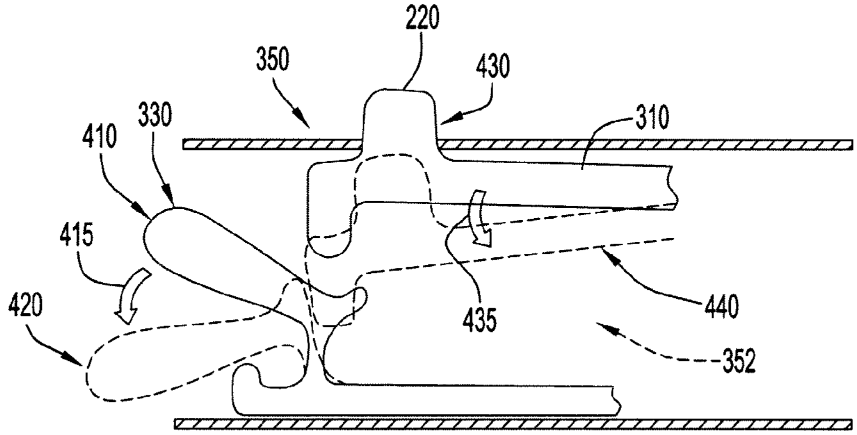
FIG. 4B illustrates a partial cross-sectional side view of the connector illustrated in FIG. 4A showing alternative configurations of the connector within a support member.

Referring to FIGS. 4A and 4B, cross-sectional views of some of the internal components of connection 180 are illustrated. In FIG. 4A, the connection between the first member 165 and the second member 170 is illustrated. The connector 300 is positioned in the channel 280 of support member 165 with projection 220 extending through the opening 205 of member 165 and protruding through an opening 210A formed in support member 170.

FIG. 4A illustrates distances referred to as a projection distance $P_D$ and a gap distance $G_D$. The projection distance $P_D$ can be defined as the distance between the outermost point of the projection 220 and the outer surface 276 of the first member 165. The gap distance $G_D$ can be defined as the distance between the distal or inner end 341 of the stop member 340 and the engaging end or surface 337 of the seat 336. When the projection distance $P_D$ is approximately equal to the gap distance $G_D$, a user can depress the top of projection 220 down to the outer surface 276 of the first member 165. In this position, the seat 336 prevents the stop member 340, and thus the projection 220, from being lowered any farther into the channel 280 of the first member 165. The extent to which the projection 220 can be moved into the support member 165 is determined by the relationship between the projection distance $P_D$ and the gap distance $G_D$. When $P_D$ is less than $G_D$, the connector 300 can move inside of member 165 and become trapped or lost.

Referring to FIG. 4B, the connector 300 is illustrated in a deployed or extended configuration 350 (shown in solid lines) and in a collapsed or retracted configuration 352 (shown in dashed lines). The deployed configuration can be referred alternatively to as locked or coupled configuration and the collapsed configuration can be referred to alternatively as an unlocked or decoupled configuration. In this embodiment, the abutment or engagement member 330 is tilted out of the path of the first portion 310 when the abutment 330 in configuration 352.

The different portions of the connector 300 have different positions when the connector 300 is in its extended configuration 350 or in its retracted configuration 352. In particular, the abutment 330 can be moved between an engaging position 410 and a retracted position 420. A directional arrow 415 illustrates the direction of motion of the abutment 330 as it moves from position 410 to position 420. Similarly, the first portion 310 can be moved and accordingly, the projection 220 can be moved between an extending position 430 and a retracted position 440. A directional arrow 435 illustrates the direction of motion of the projection 220 as it moves from position 430 to position 440. The flexibility of the stem or portion 334 based on its thickness and its material permits the movement of the actuator 332.

Figure 5:
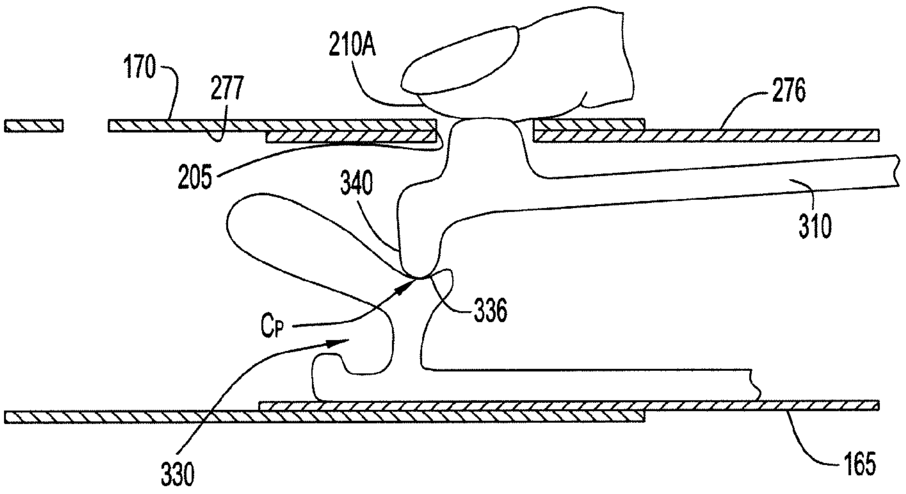
FIG. 5 illustrates a side view of a portion of the connector illustrated in FIG. 3A in a configuration in which its movement is limited.

FIG. 5 illustrates a partial cross-sectional view of the connector 300 disposed within the coupled members 165 and 170. In this illustration, the first portion 310 has been moved inwardly. The projection 220 is aligned with openings 205 and 210A. In this position, the stop member 340 engages the seat 336 of the abutment 330. This engagement prevents the projection 220 from being depressed farther inwardly. Stop member 340 contacts the seat 336 at a contact point $C_P$. In this position, the projection 220 is depressed so that the outermost portion is even with the outer surface 276 of support member 165.

When the outermost portion of the projection 220 is disposed below the inner surface 277 of support member 170, the projection 220 is depressed below and out of engagement with opening 210A. In this position, the projection 220 is no longer positioned to prevent relative sliding movement of support member 165 relative to support member 170. As a result, support member 170 can be slid along support member 165. Support member 165 can be repositioned relative to support member 170 so that opening 205 is aligned with one of the openings 210A, 210B, or 210C of support member 170. Upon alignment of openings, the projection 220, which is biased in the radial direction R, passes or snaps through the aligned opening on support member 170 and through opening 205 to couple support members 165 and 170.

Referring to FIG. 5, when the first portion 310 is positioned such that stop member 340 engages the seat 336, the top of projection 220 is not disengaged from opening 205. As long as projection 220 remains in opening 205, the connector 300 cannot be moved with respect to or disengaged from support member 165.

In one embodiment when a connector does not include an abutment 330, a user can over-insert the projection 220 or press the projection 220 inwardly a distance that results in the disengagement of the connector from the support members 165 and 170. An over-insertion occurs when the outermost point of the projection 220 is depressed past the inner surface 275 of support member 165. In this case, the projection could slide out of alignment with opening 205 and become stuck in support member 165. The connector could require considerable effort before realignment with the opening 205 could be achieved. Furthermore, the connector 300 could easily move to a hard-to-reach position within support member 165. The abutment 330 according to the present invention eliminates the shortcomings of other connectors by ensuring the capture and position of the projection 220 within the opening 205 and relative to support member 165.

Figure 6A:
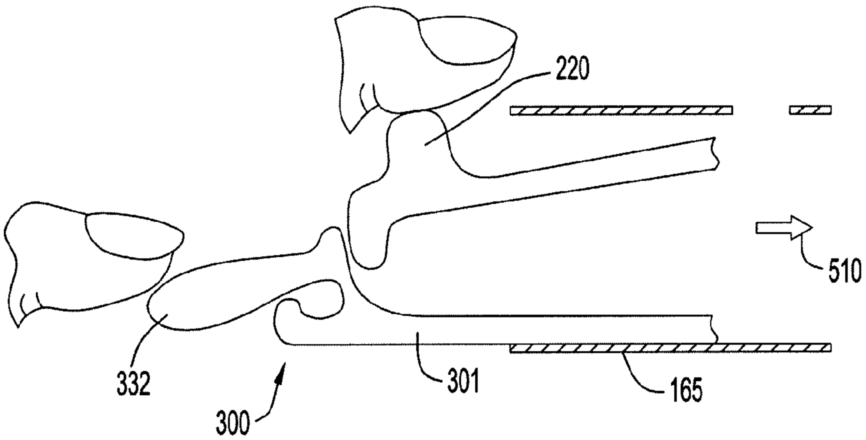
FIG. 6A illustrates a side view of a portion of the connector illustrated in FIG. 3A in a configuration permitting insertion of the connector into a member.
Figure 6B:
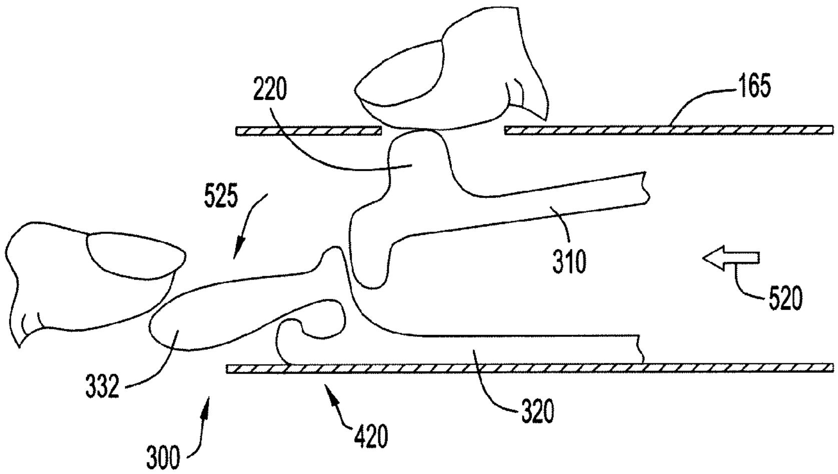
FIG. 6B illustrates a side view of a portion of the connector illustrated in FIG. 3A in a configuration permitting removal of the connector from a member.

FIGS. 6A and 6B illustrate an exemplary method of inserting and removing the connector 300 into and out of support member 165. As shown in FIG. 6A, before a portion of member 170 is placed over a portion of member 165, a user inserts the hinge portion of the flexible body 301 into the inner area or channel 280 of member 165. The direction of insertion is indicated in FIG. 6A by arrow 510. The user can then insert the remainder of the flexible body 301 into the channel 280 of member 165 by depressing the projection 220 until the top of the projection 220 is below the inner surface 275 of member 165. The user can then angularly align the projection 220 with opening 205 in member 165 and insert the flexible body 301 along the axial direction A until the projection 220 is biased into the opening 205 by the flexible body 301. As a result, the projection 220 protrudes through the opening 205 as shown in FIGS. 2A and 4A. In this position, the projection 220 is secured in place relative to member 165 and now member 170 can be slid onto and coupled to member 165 as described above.

FIG. 6B illustrates the method of removing the connector 300 from member 165, which is exemplary of an action relating to the complete disassembly of a frame of a support structure. As shown, a user can press the actuator 332 outwardly along the direction of arrow 525 toward second portion 320 to reconfigure the abutment 330 from a first position or configuration 410 to a second position or configuration 420. When the abutment in the second position 420, the stop member 340 can move past the abutment 330. In this arrangement, the projection 220 can then be depressed through opening 205 and past the inner surface 275 of support member 165. With the projection 220 completely clear of first opening 205, the connector 30 can be slid out of support member 165 along the direction of arrow 520 and along the inner surface 275 of the first member 165.

In other embodiments in accordance with the invention, the second support member may include a single one opening. In other embodiments, the biasing force of the flexible body of the connector can be generated by a coil spring or leaf spring that is disposed between a first portion and a second portion of the connector. Accordingly a first portion including a projection can be biased in a first direction and a second portion biased in an opposite direction.

Thus, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer," and the like as may be used herein, merely describe points of reference and do not limit the present invention to any particular orientation or configuration.

What is claimed is:

1. A connector for coupling a first tubular member to a second tubular member, the first tubular member being telescopically coupled with the second member, the first member including a first radial opening and the second member including a second radial opening configured to align with the first radial opening, the connector being insertable into the first tubular member, the connector comprising:

a first arm and a second arm, the arms having opposing proximal and distal ends, wherein the proximal arm ends are pivotally connected such that the distal end of the first arm is configured to move toward the distal end of the second arm, wherein:

the first arm includes:

an inner surface and an outer surface opposite the inner surface, and a projection extending from the outer surface and disposed proximate the distal end of the first arm, the projection being configured to extend through the first radial opening and the second radial opening; and the second arm includes:

an inner surface and an outer surface opposite the inner surface, and an engagement member extending inwardly from the inner surface and disposed proximate the distal end of the second arm, the engagement member comprising a resilient stem extending inwardly from the second arm and an actuator extending from the resilient stem and axially away from the proximal ends, wherein the engagement member is movable between:

a first configuration, in which pressing the actuator flexes the engagement member axially away from the proximal ends, toward the distal end of the second arm, and toward the inner surface of the second arm to a biased position, in which the resilient stem is flexed and the engagement member does not abut the first arm as the first arm moves toward the second arm, and a second configuration, in which releasing the actuator allows the engagement member to return to an unbiased position in which the engagement member is axially and radially positioned to abut the first arm as the first arm moves toward the second arm, wherein, when the engagement member is in the first configuration, the first and second arms of the connector can be compressed so as to allow insertion of the connector into the first tubular member such that, upon release of the first and second arms, the projection extends through the first radial opening by a first distance, and wherein, when the engagement member is in the second configuration, the first arm is separated from the engagement member by a second distance, the second distance being less than the first distance such that, when the first and second tubular members are telescopically coupled with the first and second radial openings aligned, and the projection extends through the first and second radial openings with the engagement member in the second configuration, removal of the connector from the first tubular member is prevented.

2. The connector of claim 1, wherein the first arm and the second arm are connected to form a flexible body and the flexible body biases the first arm away from the second arm when the first arm is urged toward the second arm.

3. The connector of claim 1, wherein the first arm and the second arm are connected by a resilient living hinge.

4. The connector of claim 1, wherein the first arm and the second arm are integrally formed.

5. The connector of claim 1 further comprising a stop member extending inward from the inner surface of the first arm, the stop member being configured to engage the engagement member.

6. The connector of claim 5, wherein the engagement member further comprises an extension and a seat disposed between the actuator and the extension, the seat being configured to receive the stop member.

7. The connector of claim 1, further comprising the first tubular member including the first radial opening and the second tubular member including the second radial opening, wherein the first tubular member telescopes within the second tubular member to selectively align the radial openings, and wherein the projection is operable to extend through aligned first and second radial openings.

8. The connector of claim 7, wherein:

the first tubular member and second tubular member are axially locked when the first and second arms of the connector are released within the first tubular member and the projection is received in the first and second radial openings; and disengagement of the projection from both the first and second openings is prevented when the engagement member is in the second configuration.

* * * * *